(12) United States Patent
Grill

(10) Patent No.: US 6,481,689 B2
(45) Date of Patent: *Nov. 19, 2002

(54) BALANCED FLUID CONTROL VALVE

(75) Inventor: Benjamin Grill, Woodland Park, CO (US)

(73) Assignee: Sturman BG, LLC, Woodland Park, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/861,301

(22) Filed: May 18, 2001

(65) Prior Publication Data

US 2002/0000255 A1 Jan. 3, 2002

Related U.S. Application Data

(63) Continuation-in-part of application No. 09/499,404, filed on Feb. 7, 2000, now Pat. No. 6,234,202, which is a continuation of application No. 09/020,535, filed on Feb. 9, 1998, now Pat. No. 6,116,276.

(51) Int. Cl.[7] ............................ F16K 31/06; F16K 41/12
(52) U.S. Cl. ............................ 251/129.07; 251/129.16; 251/129.17
(58) Field of Search ........................ 251/129.07, 129.16, 251/129.17

(56) References Cited

U.S. PATENT DOCUMENTS

| | | | |
|---|---|---|---|
| 2,322,911 A | | 6/1943 | Beam |
| 2,826,215 A | * | 3/1958 | Wolfslau et al. ........ 251/129.07 |
| 3,304,048 A | * | 2/1967 | Roberts ................. 251/282 |
| 3,414,231 A | * | 12/1968 | Kreuter ................. 251/282 |
| 3,534,770 A | * | 10/1970 | Kowalski ............... 251/282 |
| 3,683,239 A | | 8/1972 | Sturman |
| 3,743,898 A | | 7/1973 | Sturman |
| 3,985,333 A | * | 10/1976 | Paulsen ................. 251/129.07 |
| 4,409,638 A | | 10/1983 | Sturman et al. |
| 4,624,285 A | | 11/1986 | Perach |
| 4,641,686 A | | 2/1987 | Thompson |
| 4,741,365 A | | 5/1988 | Van Ornum |
| 4,857,842 A | | 8/1989 | Sturman et al. |
| 4,870,892 A | | 10/1989 | Thomsen et al. |
| 5,007,458 A | | 4/1991 | Marcus et al. |
| RE34,261 E | | 5/1993 | Sule |
| 5,345,857 A | | 9/1994 | Murphy |
| 5,598,871 A | | 2/1997 | Sturman et al. |
| 5,640,987 A | | 6/1997 | Sturman |
| 5,718,264 A | * | 2/1998 | Sturman ............. 251/129.07 X |
| 5,720,261 A | | 2/1998 | Sturman et al. |
| 6,035,895 A | * | 3/2000 | Grill et al. .......... 251/129.07 X |
| 6,116,276 A | | 9/2000 | Grill |
| 6,234,202 B1 | | 5/2001 | Grill |

FOREIGN PATENT DOCUMENTS

| | | |
|---|---|---|
| DE | 1 550 322 | 1/1969 |
| DE | 1 550 632 | 1/1970 |
| DE | 1 475 930 | 10/1970 |
| GB | 1 526 630 | 9/1978 |

OTHER PUBLICATIONS

Anderson et al., SAE Technical Paper Series "Adaptive Lift Control for a Camless Electrohydraulic Valvetrain," Feb. 23–26, 1998.

(List continued on next page.)

Primary Examiner—Gerald A. Michalsky
(74) Attorney, Agent, or Firm—Blakely, Sokoloff, Taylor & Zafman LLP

(57) ABSTRACT

A dynamically balanced fluid control valve controls a fluid between two connection ports. A tube couples two diaphragms at opposing ends of the tube. A valve is coupled to the tube between the opposing ends to control a valve port. Actuators move the transfer tube to move the valve. The diaphragms dynamically balance the force exerted by the fluid on the valve in both the open and closed positions of the valve.

15 Claims, 2 Drawing Sheets

OTHER PUBLICATIONS

Brezonick, "Vickers Taking Closer Aim at Mobile Markets," reprint, Diesel Progress North American Edition, Aug. 1977.

Brown, "The Swing to Cleaner, Smarter, Hydraulics," excerpt, pp. 152(A)(F)(J)(K), Fortune Magazine, Jun. 9, 1997.

Bryson, Jr. et al., "Applied Optimal Control, Optimization, Estimation, and Control," Hemisphere Publishing Corporation, 1975.

Friedland, "Advanced Control System Design", 1996 by Prentice–Hall, Inc.

Jeronymo et al., "Application of Unified Predicitive Control to On/Off Control of Hydraulic System Driven by Fast–Switching Solenoid Valves," Series C, vol. 39, No. 3, 1996.

Misovec et al., SAE Technical Paper Series, 1999–01–0825, "Digital Valve Technology Applied to the Control of an Hydraulic Valve Actuator", Mar. 1–4, 1999.

Sturman et al., Machine Design, Feb. 21, 1994, "Breakthrough in Digital Valves".

Wilson, "Development in Digital Valve Technology," reprint, Diesel Progress North American Edition, Apr. 1997.

* cited by examiner

BALANCED FLUID CONTROL VALVE

CROSS REFERENCE TO RELATED APPLICATIONS

This is a continuation-in-part of U.S. application Ser. No. 09/499,404, filed Feb. 7, 2000, now U.S. Pat. No. 6,234,202, which is a continuation of U.S. application Ser. No. 09/020,535, filed Feb. 9, 1998, now U.S. Pat. No. 6,116,276.

BACKGROUND OF THE INVENTION

Fluid control valves may contain a valve and valve seat that controls the flow of fluid between two or more connection ports located in the valve housing. The flow of fluid between the connection ports is determined by the position of the valve relative to the valve seat. By way of example, in a two-way valve, when the valve is lifted away from the seat, a first connection port is in fluid communication with a second connection port. When the valve is in contact with the valve seat, the fluid communication between the first and second connection ports is blocked. The position of the valve is typically controlled by one or more actuators such as electrical solenoids.

Fluid control valves must provide a force to hold the valve in the desired operating position. Typically the fluid being controlled will be under pressure and the pressure of the fluid will produce a net pressure force on the valve that must be overcome by the fluid control valve to hold the valve in the desired operating position. This increases the force that must be provided by the fluid control valve. If the fluid pressure forces vary depending on the valve position or the pressure of the controlled fluid, additional complexities are introduced into designing a valve that operates efficiently and reliably under a range of conditions.

Dynamically unbalanced valves may require the actuators to overcome the pressure of the fluid to move or hold the valve. The additional work required to overcome the fluid pressure consumes more power and reduces the energy efficiency of the system. Therefore it would be desirable to provide a fluid control valve that is dynamically balanced.

SUMMARY OF THE INVENTION

A dynamically balanced fluid control valve controls a fluid between two connection ports. A tube couples two diaphragms at opposing ends of the tube. A valve is coupled to the tube between the opposing ends to control a valve port. Actuators move the transfer tube to move the valve. The diaphragms dynamically balance the force exerted by the fluid on the valve.

BRIEF DESCRIPTION OF THE DRAWINGS

The objects and advantages of the present invention will become more readily apparent to those ordinarily skilled in the art after reviewing the following detailed description and accompanying drawings, wherein.

DETAILED DESCRIPTION OF THE INVENTION

Figure 1:
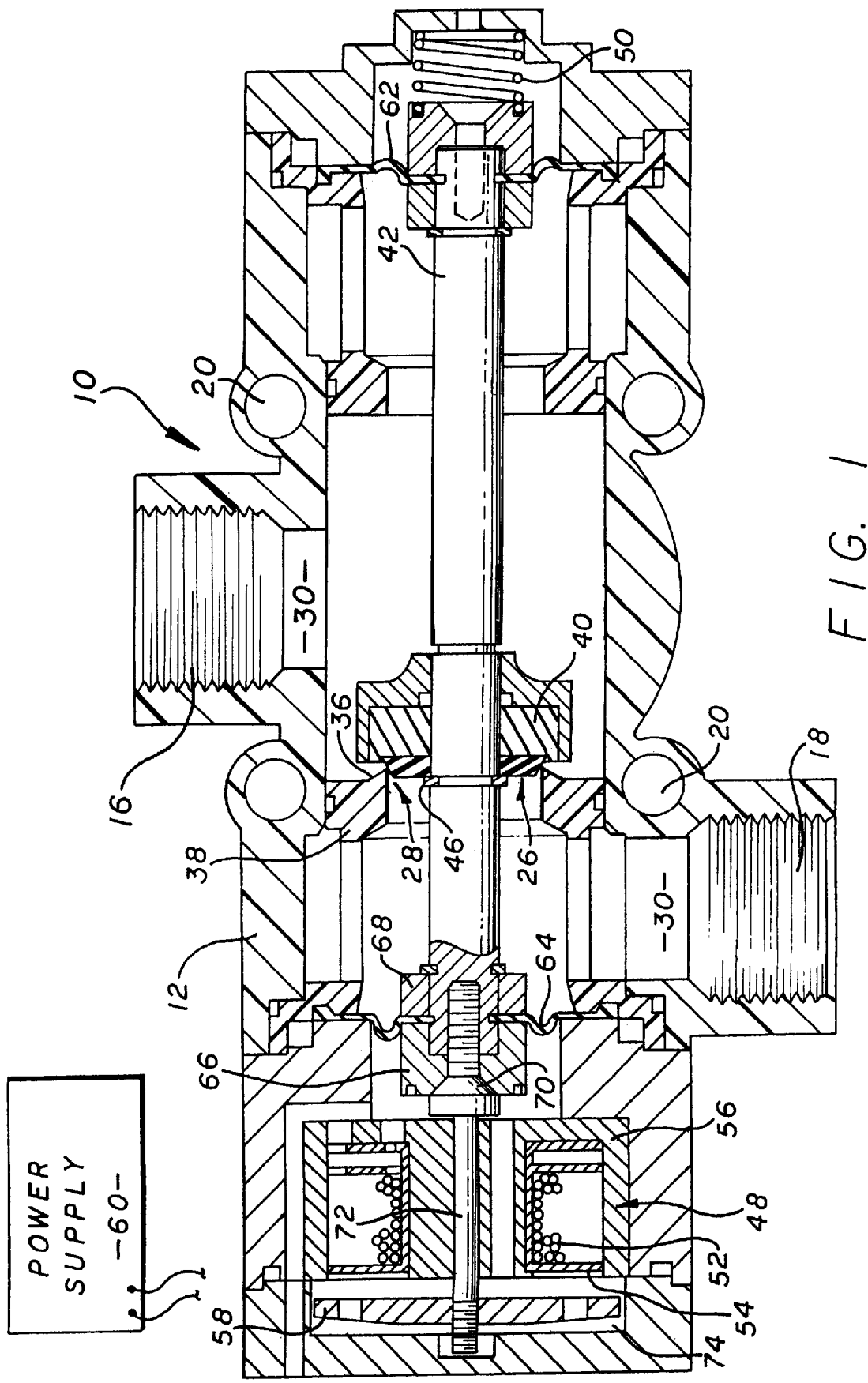
FIG. 1 is a cross-sectional view of a fluid control valve of the present invention with the valve in a first position.

Referring to the drawings more particularly by reference numbers, FIG. 1 shows a fluid control valve 10 of the present invention. The fluid control valve 10 is used to control the flow of fluid in a fluid system. The fluid control valve 10 has a housing 12 which contains a first connection port 16 and a second connection port 18. The first connection port 16 may be connected to a supply of fluid. The second connection port 18 may be connected to an output device. The housing 12 is preferably constructed from a plastic material such as polypropylene that is resistant to the fluid to be controlled. The plastic material may be reinforced with 15% glass to increase the strength of the housing 12. The housing 12 may have mounting holes 20 to allow the fluid control valve 10 to be mounted to a substrate (not shown). Although two connection ports 16 and 18 are shown and described, it is to be understood that the valve may have any number of ports. For example, the valve may have two inlet ports and a single outlet port, thus allowing multiple valves with a common supply to be manifolded together.

The fluid control valve 10 has a valve 26 located adjacent to a valve port 28. The term valve port is used herein to mean the open area defined by the valve seat 36 and selectively opened and closed by the valve 26. The valve 26 controls the flow of a fluid 30 through the valve port 28. The valve 26 cooperates with the valve seat 36 to close the valve port 28. The valve seat 36 may extend from an inner sleeve 38. The inner sleeve 38 is preferably constructed from a molded plastic material that is relatively soft and thus minimizes the wear on the valves. Additionally, the valve 26 may have a plug 40 that is constructed from a relatively soft material such as a hardened rubber. The rubber plug 40 reduces and compensates for wear on the valve assembly.

Figure 2:
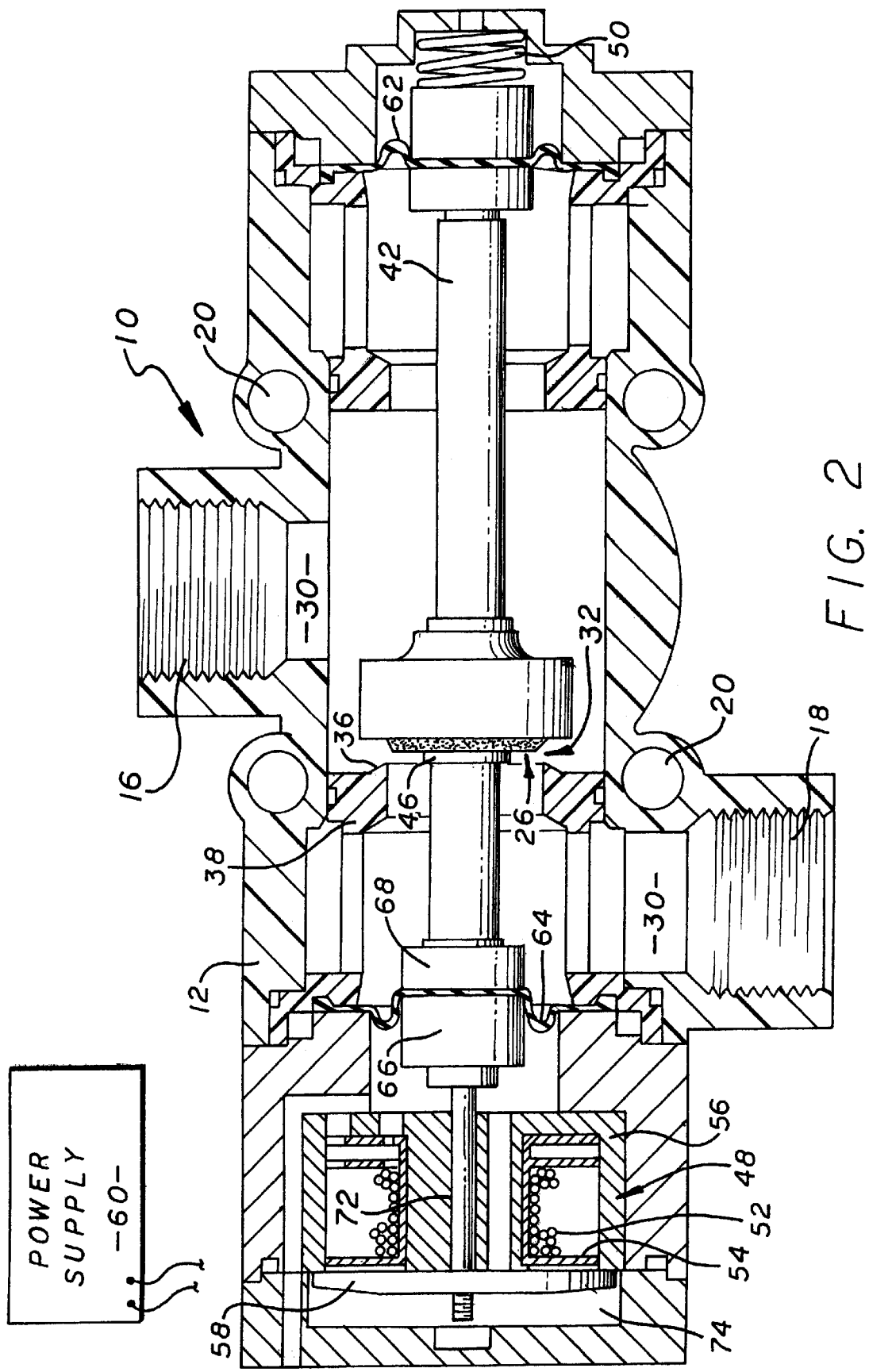
FIG. 2 is a cross-sectional view of the fluid control valve with the valve in a second position.

When in an open position the valve is separated from the seat by an annular gap 32 (FIG. 2). The annular gap 32 provides a relatively large flow area which minimizes the pressure drop across the valve and provides a valve assembly that is less susceptible to clogging. In the preferred embodiment, the valve 26 has a diameter of approximately 0.85 inches and is separated from the seat by a space 0.165 inches wide.

The valve 26 is coupled to a transfer tube 42 that extends through the housing 12. The valve 26 may be held captive to the transfer tube by a pair of clips 46. The transfer tube 42 is coupled to actuators that move the transfer tube between a first and a second position. Exemplary actuators include an electrical solenoid 48 and a return spring 50.

When the solenoid 48 is actuated, the transfer tube 42 moves from the first position to the second position as shown in FIG. 2. In the second position the valve 26 is separated from the seat 36 to allow fluid communication through the valve port 28 between the first connection port 16 and the second connection port 18. When the solenoid 48 is de-activated the return spring 50 moves the transfer tube 42 back to the first position. In the first position, the valve 26 is pressed against the valve seat 36 to prevent fluid flow through the valve port 28 between the first connection port 16 and the second connection port 18.

In the embodiment shown in the figures, the solenoid 48 has a coil 52 that is wrapped around a bobbin 54. The bobbins 54 are mounted to a magnetic core 56. The core 56 is coupled to an armature 58. The armature 58 is pulled into contact with the core 56 when the solenoid 48 is actuated. The armature 58 is pushed away from the core 56 by the force exerted by a spring 50 when the solenoid 48 is de-activated. Thus, in this embodiment, the solenoid 48 provides an actuating means coupled to the transfer tube 42 for moving the valve 26 from a closed to an open position to allow fluid communication between the first connection port 16 and the second connection port 18; the spring 50 provides a second actuating means coupled to the transfer tube 42 for moving the valve from the open position to the closed position to prevent fluid communication between the first connection port 16 and the second connection port 18.

In one embodiment, the armatures 58 and core 56 are preferably constructed from a magnetic steel material which can selectively develop enough residual magnetism to maintain the armature 58 in contact with the core even when power to the coil 46 is terminated. The attractive residual magnetic forces allow the solenoids to be magnetically latched by digital signals. In the preferred embodiment, the armatures 58 and core 56 are constructed from hardened 52100 or 440C steel. The solenoid 48 receives power from a power supply 60. The power supply 60 provides digital pulses to the coil 52 to actuate and latch the solenoid 48. The solenoid 48 can be actuated with a voltage of one polarity and de-activated with a voltage having an opposite polarity. The opposite polarity will induce a force to separate the armature 58 from the core 56. Latching the valve into position with digital pulses consumes less power than valves of the prior art which require a continuous supply of power to maintain the position of the valve.

In operation, the power supply 60 provides a signal to actuate the solenoid 48. As shown in FIG. 2, the solenoid 48 pulls the armature 58 and moves the transfer tube 42 to the second position, so that the fluid 30 flows between the first connection port 16 and the second connection port 18. If the solenoid is of a residual magnetism construction, power to the solenoid 48 may be terminated, wherein the hysteresis of the pole and armature material maintains the transfer tube 42 in the first position.

To change the flow of the fluid, the power supply 60 provides a signal or removes the activating signal to de-activate the solenoid 48. In the embodiment shown in FIG. 1, the return spring 50 moves the transfer tube 42 back to the first position. In the first position, the valve 26 closes the valve port 28 and prevents fluid communication between the first connection port 16 and the second connection port 18.

In one embodiment, the solenoid 48 serves as the both the actuator to open the valve 26 and the actuator to close the valve 26 through the use of voltages with different polarities. In this embodiment it may be possible to eliminate the spring 50 because the dynamically balanced design of the fluid control valve 10 requires only a small force to hold the valve 26 in the open or the closed position.

The fluid control valve 10 further contains a first diaphragm 62 and a second diaphragm 64. In the embodiment shown in the figures, the diaphragms 62, 64 seal the return spring 50 and the solenoid 48. The diaphragms 62 and 64 may be captured by the inner sleeves 38 and the housing 12. Each diaphragm 62 and 64 is attached to transfer tube 42. The attachment may be by a head 66 and a washer 68. The heads 66 are fastened to the tube 42 by screws 70. The armature 58 may have a pin 72 that engages the screw of the second diaphragm 64. The housing 12 and second diaphragm 64 define a chamber 74. The chamber 74 may contain a glycol based fluid that lubricates the armature 58 and core 56, and reduces the wear of the solenoid components.

The diaphragms 62 and 64 each have an effective area that is in fluid communication with the fluid 30 of the valve. The diaphragm area is approximately equal to the area of the valve port 28. Each diaphragm area is located on opposing sides of the valve 26 so that there are opposing fluid pressure forces on the diaphragms and the valves. The opposing forces create a net fluid force on the transfer tube 42 that is approximately zero. The zero net force dynamically balances the valve so that the solenoid does not have to generate work to overcome the fluid pressure when switching the tube 42 from one position to another position.

When the valve 26 is in the closed position, as shown in FIG. 1, the pressure of the fluid 30 between the valve 26 and the second connection port 18 exerts a force on the valve 26 over the area of the valve port 28 and an approximately equal and opposite force on the diaphragm 64 adjacent the second port 18. Thus there is little or no net force exerted on the valve by the pressure of the fluid 30 between the valve 26 and the second connection port 18. Similarly, the pressure of the fluid 30 between the valve 26 and the first connection port 16 exerts a force on the valve 26 and the diaphragm 62 adjacent the first connection port 16. The valve seat 36 is tapered so that the valve 26 contacts the valve seat 36 over a relatively small annular area. The fluid is able to exert equal and opposite forces on the outer annular portions of the valve 26 that extends beyond the valve port 28. The fluid exerts a net force on the valve 26 over the area of the valve port 28 and an approximately equal and opposite force on the diaphragm 62 adjacent the first port 16. Thus there is little or no net force exerted on the valve by the pressure of the fluid 30 between the valve 26 and the first connection port 16. This provides dynamic pressure balance when the fluid control valve 10 is in the closed position.

When the valve 26 is in the open position, as shown in FIG. 2, the pressure of the fluid 30 exerts equal and opposite forces on the valve 26. The fluid also exerts substantially equal and opposite forces on the two diaphragms 62, 64 that are coupled by the transfer tube 42. This provides dynamic pressure balance when the fluid control valve 10 is in the open position.

It will be appreciated that the valve 26 contacts the valve seat 36 over a relatively small but finite annular area. If the two diaphragms have equal areas exposed to the fluid, then the fluid control valve 10 will be completely balanced in the open position and slightly imbalanced in the closed position because of the area of valve seat contact. Alternatively, the diaphragm 64 adjacent the second connection port 18 can have an effective area exposed to the fluid equal to the inner, open, area of the valve port 28, and the diaphragm 62 adjacent the first connection port 16 can have an effective area exposed to the fluid equal to the inner area of the valve port 28 plus the area of valve seat contact so that the fluid control valve 10 will be completely balanced in the closed position and slightly imbalanced in the open position due to the slight difference in diaphragm areas. The relative diaphragm areas may be adjusted to provide a compromise with lesser imbalance in both the open and closed positions. It will be appreciated that this imbalance can be minimized by minimizing the area of valve seat contact.

The present invention thus provides a dynamically balanced fluid control valve.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art.

What is claimed is:

1. A two-way fluid control valve that controls a flow of a fluid, comprising:

a housing that has a first connection port, a second connection port, and a valve port having a first side and an opposing second side;

a transfer tube having a first end and an opposing second end, the transfer tube extending through the valve port with the first end extending from the first side;

exactly one valve coupled to the transfer tube between the opposing ends, the valve located adjacent to the second side of the valve port;

an electrical solenoid that acts on the first end of the transfer tube to move the transfer tube from a first position to a second position and move the valve away from the valve port thereby opening the valve port to allow fluid communication between the first connection port and the second connection port, the electrical solenoid being adapted to selectively have a residual magnetism that retains the transfer tube in the second position when current is not being provided to the electrical solenoid;

a second actuator that moves the transfer tube from the second position to the first position to move the valve into contact with the valve port and close the valve port to prevent fluid communication between the first connection port and the second connection port;

a first diaphragm coupled to the first end of the transfer tube, the first diaphragm having an effective area that is in fluid communication with the fluid and is approximately equal to the area of the valve port; and, a second diaphragm coupled to the second end of the transfer tube, the second diaphragm having an effective area that is in fluid communication with the fluid and is approximately equal to the area of the valve port, the first diaphragm and the second diaphragm dynamically balancing the force exerted by the fluid.

2. The fluid control valve of claim 1, further comprising a power supply that provides a digital pulse that moves the electrical solenoid to the second position.

3. The fluid control valve of claim 1, wherein the second actuator is a return spring.

4. The fluid control valve of claim 1, wherein the housing is constructed from a plastic material.

5. The fluid control valve of claim 1, wherein the first diaphragm provides a seal between the fluid and the first actuator.

6. The fluid control valve of claim 5, wherein the second diaphragm provides a seal between the fluid and the second actuator.

7. The fluid control valve of claim 1, further comprising a valve seat that circumscribes the valve port, the valve seat being tapered so that the area of contact between the valve seat and the valve is minimized when the valve is in contact with the valve port.

8. A two-way fluid control valve that controls a flow of a fluid, comprising:

a housing that has a first connection port, a second connection port, and a valve port having a first side and an opposing second side;

a force transfer means having a first end and an opposing second end, the force transfer means extending through the valve port with the first end extending from the first side;

exactly one valve means coupled to the force transfer means between the opposing ends, the valve means located adjacent to the second side of the valve port for closing the valve port;

a first actuating means that acts on the first end of the force transfer means for moving the valve means from a first position to a second position such that the valve means is moved away from the valve port and the valve port is open to allow fluid communication between the first connection port and the second connection port, the first actuating means being adapted to have a residual magnetism that retains the force transfer means in the second position without requiring an electrical current;

a second actuating means for moving the valve means from the second position to the first position such that the valve means closes the valve port and prevents fluid communication between the first connection port and the second connection port;

a first pressure responsive means coupled to the first end of the force transfer means, the first pressure responsive means having a first effective area to produce a force responsive to the pressure of the fluid, the effective area being approximately equal to the area of the valve port; and, a second pressure responsive means coupled to the second end of the force transfer means, the second pressure responsive means having a second effective area to produce a force responsive to the pressure of the fluid, the effective area being approximately equal to the area of the valve port, the first pressure responsive means and the second pressure responsive means dynamically balancing the force exerted by the fluid.

9. The fluid control valve of claim 8, wherein the first actuating means is an electrical solenoid.

10. The fluid control valve of claim 9, further comprising a power supply that provides a digital pulse that moves the electrical solenoid to the second position.

11. The fluid control valve of claim 8, wherein the second actuating means is a return spring.

12. The fluid control valve of claim 8, wherein the housing is constructed from a plastic material.

13. The fluid control valve of claim 8, wherein the first pressure responsive means is further for providing a seal between the fluid and the first actuating means.

14. The fluid control valve of claim 13, wherein the second pressure responsive means is further for providing a seal between the fluid and the second actuating means.

15. The fluid control valve of claim 8, further comprising a valve seat that circumscribes the valve port, the valve seat being tapered so that the area of contact between the valve seat and the valve means is minimized when the valve means is in contact with the valve port.

* * * * *